United States Patent

[11] 3,602,753

| [72] | Inventors | Lyle W. Evans<br>Seneca Falls, N.Y.;<br>Sixdeniel Faria, Townada, Pa.; Walter W. Slobbe, Senaca Falls, N.Y.; Lyle K. Williams, Wysox, Pa. |
|---|---|---|
| [21] | Appl. No. | 7,622 |
| [22] | Filed | Feb. 2, 1970 |
| [45] | Patented | Aug. 31, 1971 |
| [73] | Assignee | Sylvania Electric Products, Inc. |

[54] CATHODE RAY TUBE SCREEN COMPRISING A SINGLE PHOSPHOR SYSTEM
9 Claims, 3 Drawing Figs.

[52] U.S. Cl. ................................................. 313/92 PH, 252/301.6 S
[51] Int. Cl. ........................................................ C09k 1/12, H01j 1/63, H01j 29/20
[50] Field of Search ............................................ 313/92, 92 PH

[56] References Cited
UNITED STATES PATENTS

| 3,231,775 | 1/1966 | Pritchard .................... | 313/92 PH |
| 3,523,905 | 8/1970 | Carvell, Jr. ................... | 252/301.6 S |

Primary Examiner—Roy Lake
Assistant Examiner—V. Lafranchi
Attorneys—Norman J. O'Malley, Donald R. Castle and Frederick H. Rinn ABSTRACT: A cathode-ray tube screen is formed of a single phosphor system capable of being formulated to exhibit an electron excited luminescence of desired hue falling within the visible spectrum. The single phosphor system embodies a four component composition wherein the host matrix comprises a two component mixture of zinc sulfide and cadmium sulfide activated with a two component mixture in the form of silver and aluminum. This four component system exhibits improved brightness and minimum color shift with increased current density.

INVENTORS.
LYLE W. EVANS,
SIXDENIEL FARIA,
WALTER W. SLOBBE, &
LYLE K. WILLIAMS

BY Donald R. Castle
ATTORNEY

CATHODE RAY TUBE SCREEN COMPRISING A SINGLE PHOSPHOR SYSTEM

REFERENCE TO RELATED APPLICATIONS

In U.S. Pat. application Ser. No. 7450, Docket No. D–5394, filed concurrently herewith, phosphor compositions are disclosed that are adaptable to form the cathodoluminescent screens of this invention. In U.S. Pat. applications Ser. No. 7977, Docket No. D–5395; and Ser. No. 8041, Docket No. D—5386, filed concurrently herewith, processes are disclosed for synthesizing the phosphors utilized in the cathode-ray tube screens of this invention.

BACKGROUND OF THE INVENTION

This invention relates to cathodoluminescent screens and more particularly to a cathode-ray tube screen employing a four component phosphor system.

Cathode-ray tubes utilized in industrial military and entertainment display applications employ a variety of screens in which many types of cathodoluminescent phosphors are used. In general, phosphors suitable for cathode-ray tube usage, usually comprise a host material or matrix structure with which one or more related activator materials are associated. Some activators are in the form of ions, generally metallic, that are believed to replace some of the cations in the matrix of the host material and function therein to cause the host material to luminesce under specific conditions of electron excitation. Other activator materials affect the luminescent properties of the phosphor in a different manner by aiding in the diffusion of a related activator substance or by promoting crystal growth. Some activator materials function in more than one manner.

The sulfide materials represent an efficient class o phosphors which has found extensive usage in forming screens for both monochrome and color display cathode-ray tubes. Examples of conventional phosphors of this class are the zinc and zinc-cadmium sulfides using various activators such as silver, copper, nickel an chlorine. It has been common in monochrome screens to use a "white" blend in the form of a physical mixture of blue-emitting silver activated zinc sulfide and yellow-emitting silver activated zinc-cadmium sulfide phosphor materials.

In cathode-ray tubes, wherein displays of a specific hue are desired, phosphor compositions are specially formulated to achieve the proper color-emissions. For example, in the patterned screens of color cathode-ray tubes a common blue-emitting phosphor has been a zinc sulfide host activated with silver and chlorine. A green-emitting phosphor, having general usage, has been a silver activated zinc-cadmium sulfide host, and a red-emitting material previously used has been a silver activated zinc-cadmium sulfide host having a high cadmium sulfide content. The commonly used silver activated sulfide phosphors, especially those having high cadmium content, exhibit inherent characteristics of relatively low brightness and severe color shift with increased current density—factors which detract from screen efficiency. Improved but more expensive red-emitting phosphors more recently used have been rare earth host structures such as, for example, yttrium vanadate, yttrium oxysulfide, and yttrium or gadolinium oxides all of which are activated with europium.

In forming an efficient cathodoluminescent display screen in a cathode-ray tube, whether it be monochromatic or color, the respective color phosphor components of the screen combination are carefully selected with particular reference to definitive color characteristics, such as hue, degree of saturation, decay time, an inherent brightness. Consideration of these characteristics is very important as a blend of the several hues should provide a balanced white of a desired color temperature when all of the phosphors are simultaneously excited.

The term desired "white" refers to a relative value of a balanced "white" such as typically represented on a conventional C.I.E. (Commission International d'Eclairage) chromaticity diagram. one such white, conventionally designated as standard illuminant C, is referenced by the intersection of "$x$" and "$y$" coordinates 0.310 and 0.316 respectively. Another white, currently utilized in many color television applications, has a somewhat lower "$x$" value being indicated as a 9300° Kelvin temperature white which can be C.I.E. defined by an "$x$" value of 0.281 and a "$y$" value of 0.311. In a similar manner, other values of relative "white" can be designated in accordance with specific requirements.

In forming a screen comprising a plurality of different color-emitting phosphors, such as a discretely patterned screen for a color tube, it is common for the several contributing phosphor materials to have widely divergent chemical compositions and differing physical characteristics. These inherent diversities result in different screening, decay, saturation, and spectral energy distribution properties which often lead to annoying application problems. Additionally, the use of phosphors of different compositions in the same screen aggravates the problem relating to efficient recovery of certain of the more expensive phosphors that may be contained therein.

OBJECTS AND SUMMARY OF THE INVENTION

It is an object of the invention to reduce the aforementioned disadvantages and to produce an improved cathode-ray tube having an improved cathodoluminescent screen therein.

A further object is to produce a cathodoluminescent screen that has improved brightness and exhibits a minimum of color shift with increased current density.

The foregoing objects are achieved in one aspect of the invention by the provision of a single phosphor system that is capable of formulation to exhibit an electron excited luminescence of desired hue falling within the visible spectrum. The system embodies a four component composition having a host matrix comprising a two component mixture of zinc sulfide and cadmium sulfide activated with a two component mixture of silver and aluminum. The screen comprises at least one phosphor composition of the four component system wherein the weight ratio of zinc sulfide to cadmium sulfide ranges from substantially 2:98 to 98:2, with the activator levels of silver and aluminum being within the ranges of from substantially 0.005 to about 0.050 weight percent and from substantially 0.0075 to about 0.060 weight percent respectively.

DESCRIPTION OF THE PREFERRED EMBODIMENTS

For a better understanding of the present invention, together with other and further objects, advantages and capabilities thereof, reference is made to the following specification and appended claims in connection with the aforedescribed drawings.

Figure 1:
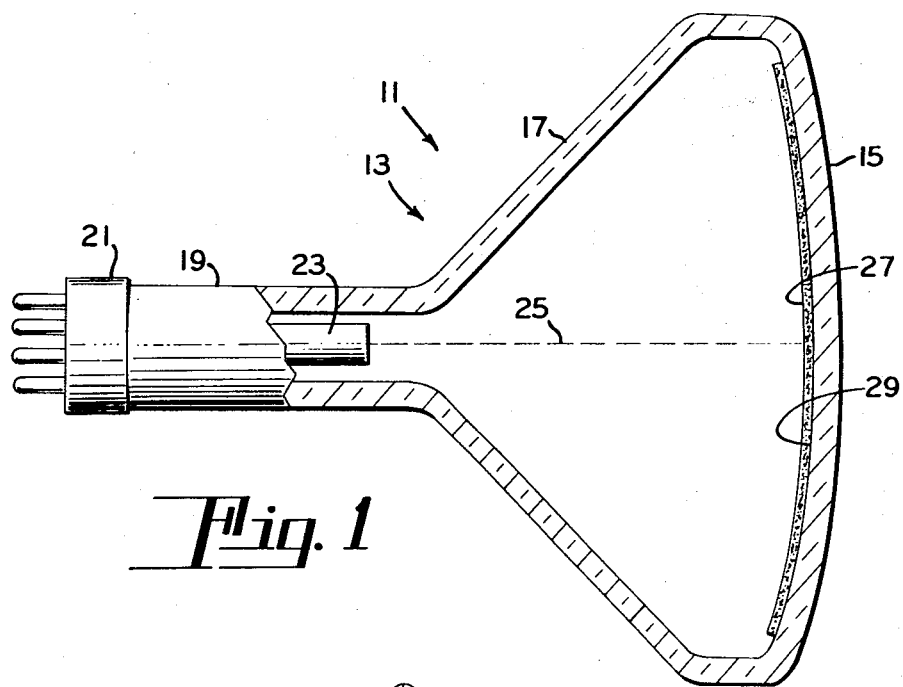
FIG. 1 is a cross-sectional view of a cathode-ray tube illustrating basic features thereof.

With reference to the drawings, there is shown in FIG. 1 a cathode-ray tube 11 comprising an evacuated envelope 13 having a viewing panel portion 15, a funnel portion 17, and a restricting neck portion 19. Attached to the terminal end of the neck portion 19 is an insulative base 21 which has electrical conductive means therethrough for connecting the tube electrodes with their associated receiver circuitry. Within the neck portion 19 there is mounted an electron generating means 23 from which emanates at least one predetermined electron beam 25 which is utilized in the operation of the tube. A cathodoluminescent screen 27 comprising at least one phosphor material is formed by conventional techniques on the interior surface 29 of the light transmissive viewing panel 15. A screen of this type can be a typically monochromatic black-and-white composition comprising a mixture of, for example, blue and yellow-emitting phosphors; or it can be in the form of a single phosphor or of a voltage sensitive mixture to present a color display of a specific hue or hues. The four component phosphor system of the invention applies to screens of the aforementioned type as will be described subsequently.

Figure 2:
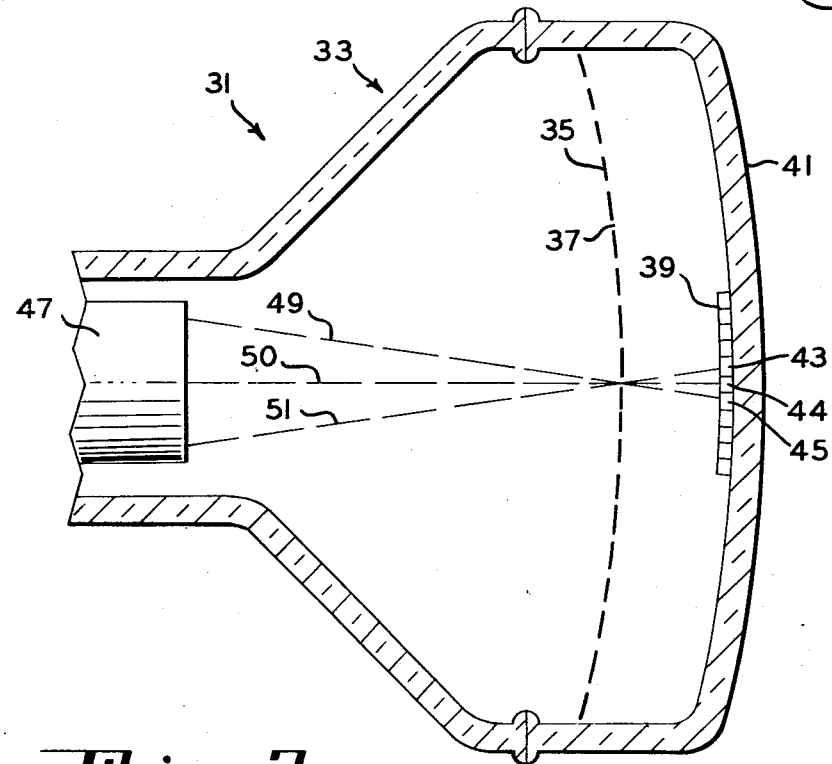
FIG. 2 is a partial cross-sectional view of a color cathode-ray tube.

In FIG. 2, portions of a type of color cathode-ray tube 31 are shown, some parts of which are similar to those of the aforedescribed tube structure. Within the envelope 33, a mask or grid electrode 35, having a plurality of apertures 37 therein, is positioned adjacent to a cathodoluminescent screen 39 formed on the screen support or panel portion 41. In this instance, the screen 39 comprises a pattern of tricolor phosphor groups in the form of a multitude of blue, green, and red color-emitting phosphor configurations 43, 44, and 45 respectively. These may be disposed as a pattern of repetitive stripes, bars or tridot groupings in accordance with the type of screen desired. The electron source or generating means 47 may be designed to issue a single beam, or it can, for example, comprise three electron gun structures, not detailed, which are oriented in a manner to provide static convergence of three separate electron beams 49, 50, and 51 at a central mask opening 33, to thence impinge the respective blue 43, green 44 and red 45 phosphor configurations of the screen pattern.

Figure 3:
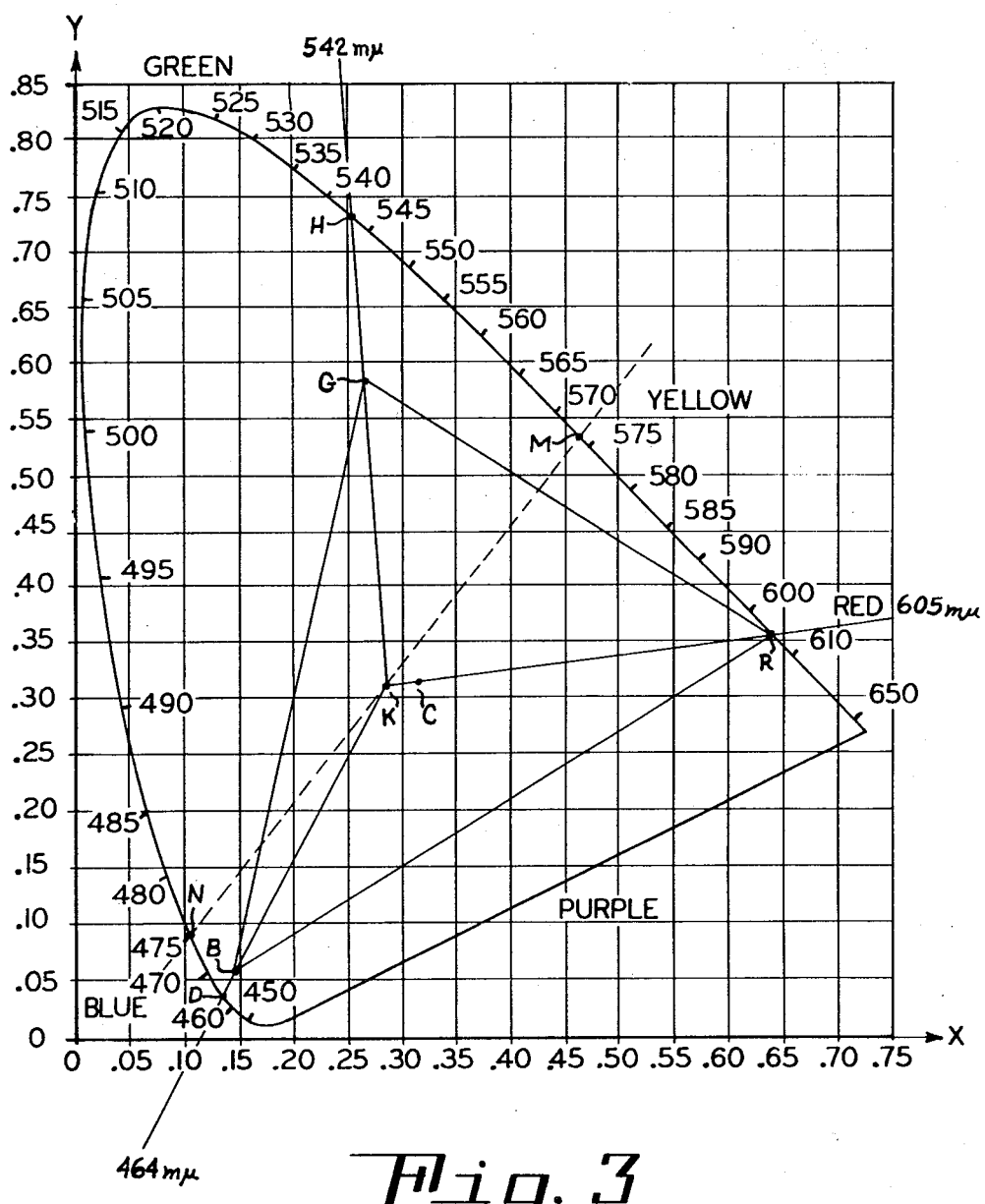
FIG. 3 shows a standard C.I.E. chromaticity diagram illustrating exemplary color coordinates of the invention.

To adequately describe the four component phosphor system of the invention, reference is directed to FIG. 3 wherein there is shown a standard C.I.E. chromaticity diagram having definitive color "$x$" and "$y$" coordinates whereby specific hues may be designated. The periphery of the horseshoe-shaped figure defines a monochromatic locus of which the blue and red ends of the spectrum are spanned by a line forming a locus of pure purple. Encompassed within the loci of the chromaticity diagram is a range of colors comprising the visible spectrum to which the normal human eye is sensitive. A sequential series of numbers, noted adjacent to the loci, indicate pure spectral wavelengths in millimicrons (mu). Thus, the hue of any color may be defined in terms of "$x$" and "$y$" coordinates. As mentioned earlier, white is a relative value of the combined additive primary color components. The 9300° K. temperature white, as considered representative in this specification, is designated by the letter "K" and "$x$" and "$y$" values of 0.281 and 0.311, respectively. A color cathode-ray tube, utilized in television applications, should evidence primary colors which approach those required by the color transmission system employed. While a certain spectral range is allowable for each of the additive primary hues, endeavor is made to define each of the three primary colors to form vertices of a triangle within the C.I.E. diagram enclosing a gamut of hues to provide a full range of color rendition. Due to the inherent capabilities of measuring instruments, the measured "$x$" and "$y$" values of specific hues cited in this specification are substantially within a range of ±0.004 units.

Screens of the present invention embody a four component phosphor system of the zinc sulfide-cadmium sulfide type activated with both silver and aluminum. It has been found that this system can be formulated to luminesce under cathode ray excitation throughout a substantial part of the visible spectrum with a brightness efficiency that is unexpectedly better than heretofore known similar materials. For example, a screen comprising the four component system yields a much higher brightness than would be expected from either zinc sulfide or cadmium sulfide alone when each is activated with silver and aluminum. Additionally, the activator material containing both silver and aluminum yields an appreciably increased brightness as compared with an activator material containing only silver or aluminum. It has been found that a screen comprising the four component system, i.e., zinc sulfide, cadmium sulfide, silver, and aluminum, exhibits greater total brightness than combinations of the same components incorporated in a three component system.

The screens of this invention comprise at least one phosphor composition of the aforementioned four component system wherein the matrix or host material is a mixture containing weight ratios of zinc sulfide to cadmium sulfide of from substantially 2:98 to about 98:2. The particular ratio chosen is dependent upon the hue of color emission desired. As the ratio of zinc sulfide to cadmium sulfide increases, the hue of the color emission shifts from red to blue across the visible spectrum. The amounts of the elements in the activator materials are within the ranges of from substantially 0.005 to about 0.050 weight percent of silver and from substantially 0.0075 to about 0.060 weight percent of aluminum, each being based upon the weight of the host. By choosing the proper proportions of the four components, it is possible to obtain a desired hue of color emission. For example, if a screen is to be made wherein the exact color emission is relatively unimportant, such as might be useful in a single color display of the type shown in FIG. 1, the zinc sulfide-cadmium sulfide ratio can be chosen in the high-visual-stimulus yellow-green 550–555 millimicron region and the amount of activator material adjusted accordingly to achieve maximum perceived brightness.

With reference to FIG. 3, an improved monochromatic screen capable of producing a 9300° K. temperature white is one in which a mixture of two four component phosphors is utilized; for example, a mixture denoted by the line M-K-N whereof a yellow-emitting phosphor is designated at "M" and a blue-emitting one indicated at "N". This screen exhibits an increased brightness of 10 to 20 percent and a more uniform white balance over a conventional screen comprising silver activated zinc sulfide and silver activated zinc-cadmium sulfide phosphors.

In Table I screen electron-excited color emissions are denoted in relation to zinc sulfide-cadmium sulfide weight ratios as exemplified in the four component system. To achieve the preferred results from these weight ratios, the amount of silver activator should be within the range of substantially 0.005 to about 0.030 weight percent and the amount of aluminum within the range of substantially 0.0075 to about 0.030 weight percent.

TABLE I

| Electron Excited Screen Color Emissions | General Wt. Ratios | | Wt. Ratios for Color CRT | Specific Tri-Color Example | |
|---|---|---|---|---|---|
| | ZnS | CdS | | Wt. Ratios | Dominant Wavelengths |
| Red | −0 | 100− | | | |
| | −5 | 95− | | | |
| | −10 | 90− | | | |
| | −15 | 85− | | 16:84 | }=605μ |
| | −20 | 80− | Color CRT | 20:80 | |
| | −25 | 75− | | | |
| Orange | −30 | 70− | | | |
| | −35 | 65− | | | |
| Yellow | −40 | 60− | | | |
| | −45 | 55− | | | |
| Yellow-Green | −50 | 50− | | | |
| | −55 | 45− | | | |
| Green | −60 | 40− | Color CRT | 62:38 | }=542μ |
| | −65 | 35− | | 64:36 | |
| | −70 | 30− | | | |
| | −75 | 25− | | | |
| Blue-Green | −80 | 20− | | | |
| | −85 | 15− | | | |
| | −90 | 10− | | 92:8 | }=464μ |
| Blue | −95 | 5− | Color CRT | 94:6 | |
| | *100 | 0* | | | |

A tricolor screen as shown in FIG. 2 is comprised of specific color-emitting compositions of the four component phosphor system as noted in Table I. For example, those blue-emitting phosphors particularly adaptable to color television screening have a weight ratio of zinc sulfide to cadmium sulfide ranging from substantially 90:10 to about 97:3. The silver activator level ranges from substantially 0.010 to about 0.030 weight percent, and the aluminum level ranges from substantially 0.0075 to about 0.0125 weight percent.

In the above noted weight ratio range for blue-emitting compositions it has been found that the "$x$" color coordinate will decrease about 0.001 unit per percent increase in cadmium content while the "$y$" *color coordinate will increase about* 0.003 units per percent increase in cadmium content. The level of silver has been found to have no appreciable effect upon the "$x$" coordinate within the useful range; however, an increase of about 0.005 weight percent in the level of silver increases the "$y$" coordinate about 0.001 units. The level of the aluminum does not have an appreciable effect upon the color-emission of the phosphor; therefore, the range of from substantially 0.0075 to about 0.0150 weight percent yields the brightest blue-emitting phosphor without excessive decay time.

A suitable green-emitting phosphor composition has a weight ratio of zinc sulfide to cadmium sulfide ranging from substantially 55:45 to about 65:35, with the silver activator level ranging from substantially 0.005 to about 0.030 weight percent and the aluminum level ranging from substantially 0.0075 to about 0.030 weight percent. In the above noted weight ratio range, it has been found that the "$x$" color coordinate increases approximately 0.015 units per percent increase in cadmium content. The "$y$" color coordinate increases about 0.005 units per percent increase in the 65:35 to 61:39 zinc sulfide-cadmium sulfide ratio range, then remains relatively constant until a ratio of about 57:43 is reached, then decreases at a rate of approximately 0.004 units per percent of cadmium increase until the 55:45 ratio is reached. The activator levels of silver and aluminum have similar effects upon the "$x$" and "$y$" coordinates of the green-emitting phosphors as with the aforedescribed blue-emitting compositions.

An appropriate red-emitting phosphor composition has a weight ratio of zinc sulfide to cadmium sulfide ranging from substantially 25:75 to about 15:85 with a silver activator level ranging from substantially 0.010 to about 0.030 weight percent with the amount of aluminum ranging from substantially 0.010 to about 0.030 weight percent.

A typical embodiment of a specific tricolor screen 39 comprised of related four component phosphors is utilized in the color tube 31 shown in FIG. 2. The blue-emitting phosphor composition included therein has a weight ratio of zinc sulfide to cadmium sulfide ranging from substantially 92:8 to about 94:6. The silver activator level ranges from substantially 0.010 to 0.030 weight percent with an aluminum level ranging from substantially 0.0075 to about 0.0125 weight percent. This composition has C.I.E. color coordinates in the finished screen defined by an "$x$" value of substantially 0.144 and a "$y$" value of substantially 0.059. A straight line K-B-D delineated from "K", the 9300° Kelvin white, through the "$x$" and "$y$" coordinates, which designate blue (B), intersects the locus at point "D", to denote a dominant wavelength of substantially 464 mu. This particular four component blue-emitting phosphor in a solid screen field has been found to exhibit an improved brightness of approximately 180 percent when related to a similar solid field of a conventional silver activated zinc sulfide phosphor.

The four component green-emitting screen field in the above-mentioned embodiment is of a phosphor composition having a zinc sulfide to cadmium sulfide weight ratio ranging from substantially 62:38 to about 64:36 with a silver activator level ranging from substantially 0.005 to about 0.030 weight percent and an aluminum level ranging from substantially 0.0075 to about 0.030 weight percent. The hue has an "$x$" value of substantially 0.263 and a "$y$" of substantially 0.580. A straight line K-G-H drawn from "K" through the "$x$" and "$y$" coordinates of Green (G) intersects the locus at "H" to designate a dominant wavelength of substantially 542 mu. This green-emitting four component phosphor in a solid screen field exhibits an improved brightness of approximately 109 percent when compared to a similar solid field of a conventional silver activated zinc-cadmium sulfide phosphor; for example, one having a weight ratio of 62:38 activated with 0.010 weight percent of silver.

The four component red-emitting screen field included in the aforementioned embodiment is of a composition having a zinc sulfide to cadmium sulfide weight ratio ranging from substantially 20:80 to about 16:84 with a silver activator level ranging from substantially 0.010 to about 0.030 weight percent and an aluminum level within the range of from substantially 0.010 to about 0.030 weight percent. A straight line K-R drawn from "K" through the "$x$" and "$y$" coordinates of Red (R), which are substantially on the locus, designate a dominant wavelength of substantially 605 mu. This red-emitting four component phosphor in a solid screen field produces an improved brightness of approximately 107 percent as compared to a similar solid field of a conventional previously used silver activated zinc cadmium sulfide phosphor; for example, one having a weight ratio of 15:85 activated with 0.010 weight percent of silver.

The following Table II presents a comparison of brightness as noted in a typical tridot color screen of a 21 inch round cathode-ray tube, such as type 21FBP22A, having an applied screen potential of 25,000 volts. Values of relative brightness for the three individual color screen patterns are denoted under similar conditions whereby values are shown for both individual and simultaneous excitations.

TABLE II

| Field Color | Total Beam Current ½µa¼ | New Four Component Sulfide Screen ½ZnCd¼ S:Ag, Al Blue, Green and Red | | | Regular Sulfide Screen ½ZnCd¼ S:Ag-Green and Red ZnS:Ag-Blue | | |
|---|---|---|---|---|---|---|---|
| | | Brightness ½F$_t$L¼ | Color Co-ordinates | | Brightness ½F$_t$L¼ | Color Co-ordinates | |
| | | | $x$ | $y$ | | $x$ | $y$ |
| Blue | 500 | 6.1 | 0.144 | 0.059 | 3.4 | 0.151 | 0.049 |
| Green | 500 | 32.2 | 0.263 | 0.580 | 29.5 | 0.274 | 0.578 |
| Red | 500 | 7.5 | 0.648 | 0.353 | 7.0 | 0.648 | 0.351 |
| White ⅙9300° K¼ | 800 | 23.2 | | | 20.5 | | |

A color screen comprising the described four component phosphor compositions makes possible the fabrication of a practical tricolor tube having a white brightness that is 10–20 percent brighter than the previously known all sulfide tubes. In addition to exhibiting improved brightness, the four component phosphors evidence a minimum of color shift with increased current density since all of the four component phosphor materials have basically the same current saturation properties. It has been found that the four component phosphors advantageously maintain beam current linearity to a higher current level than do the conventional silver activated sulfide materials.

It has been found that the phosphor compositions of the four component system can be synthesized in a manner to control particle size groupings over a relatively wide range and still achieve satisfactory brightness. This sizing attainment enables these phosphors to be formed into cathode-ray tube screens by either of the known slurry or dry phosphor techniques which inherently utilize particles of different average sizes.

Thus, improved screens are provided for a variety of cathode-ray tube applications wherein a wide range of colors in the visible spectrum are provided at improved brightness levels, and improved decay and saturation characteristics. The screen structures are improved since the several four component phosphors therein have similar surface properties, particle sizes and particle size ranges. In addition, these phosphors have important economic aspects in lowering tube manufacturing costs. Since zinc-cadmium sulfide phosphors are composed of relatively inexpensive raw materials, there is a definite economic advantage in forming a screen of like phosphor compositions in contrast to a screen including one or more rare earth phosphors therein. Although a large percentage of the rare earth phosphors can be recovered and reused, the cost of the rare earth material lost during the recovery procedure is greater than the total cost of a related four component sulfide phosphor.

While there has been shown and described what are at present considered the preferred embodiments of the invention, it will be obvious to those skilled in the art that various changes and modifications may be made therein without departing from the scope of the invention as defined by the appended claims.

We claim:

1. A cathode-ray tube screen comprising a substrate having a four component phosphor system applied to one surface thereof, said system being capable of formulation to exhibit an electron excited luminescence falling within the visible spectrum, said phosphor system having a host matrix comprising a two component mixture of zinc sulfide and cadmium sulfide activated with silver and aluminum, said four component system representing at least one phosphor composition having a weight ratio of zinc sulfide to cadmium sulfide ranging from substantially 2:98 to 98:2, with activator levels of silver and aluminum within the ranges of substantially 0.005 to about 0.050 weight percent and substantially 0.0075 to about 0.060 weight percent respectively, each being based upon the weight of said host material.

2. A cathode-ray tube screen according to claim 1 wherein at least one phosphor composition representative of the four component phosphor system includes an amount of silver activator within the range of substantially 0.005 to about 0.030 weight percent, and an amount of aluminum within the range of substantially 0.0075 to about 0.030 weight percent.

3. A cathode-ray tube screen according to claim 1 comprising at least one formulation of said four component system in the form of a substantially blue-emitting phosphor composition having a weight ratio of zinc sulfide to cadmium sulfide ranging from substantially 90:10 to about 97:3, and wherein said silver activator level ranges from substantially 0.010 to about 0.030 weight percent, and wherein said aluminum activator level ranges from substantially 0.0075 to about 0.0125 weight percent.

4. A cathode-ray tube screen according to claim 1 comprising at least one formulation of said four component system in the form of a substantially green-emitting phosphor composition having a weight ratio of zinc sulfide to cadmium sulfide ranging from substantially 55:45 to about 65:35, and wherein said silver activator level ranges from substantially 0.005 to about 0.030 weight percent, and wherein said aluminum activator level ranges from substantially 0.0075 to about 0.030 weight percent.

5. A cathode-ray tube screen according to claim 1 comprising at least one formulation of said four component system in the form of a substantially red-emitting phosphor composition having a weight ratio of zinc sulfide to cadmium sulfide ranging from substantially 25:75 to about 15:85, and wherein said silver activator level ranges from substantially 0.010 to about 0.030 weight percent, and wherein said aluminum activator level ranges from substantially 0.010 to about 0.030 weight percent.

6. A cathode-ray tube screen according to claim 1 comprising a plurality of formulations of said four component phosphor system in the form of:
a substantially blue-emitting phosphor composition having a weight ratio of zinc sulfide to cadmium sulfide ranging from substantially 92:8 to about 94:6, said silver activator level ranging from substantially 0.010 to 0.030 weight percent with said aluminum activator level being within the range of substantially 0.0075 to about 0.0125 weight percent;
a substantially green-emitting phosphor composition having a weight ratio of zinc sulfide to cadmium sulfide ranging from substantially 62:38 to about 64:36, and wherein said silver activator level ranges from substantially 0.005 to about 0.030 weight percent with said aluminum activator level being within the range of substantially 0.0075 to about 0.030 weight percent; and
a substantially red-emitting phosphor composition having a weight ratio of zinc sulfide to cadmium sulfide ranging from substantially 20:80 to about 16:84, said silver activator level ranging from substantially 0.010 to about 0.030 weight percent with said aluminum activator level being within the range of substantially 0.010 to about 0.030 weight percent.

7. A cathode-ray tube having an envelope with screen support means therein and comprising:
an electron source positioned within said envelope in spaced relationship to said screen support means to provide at least one controlled beam of electrons directed theretoward;
a cathodoluminescent screen applied to said screen support means within said envelope in a manner for said electron beam to impinge thereon, said screen comprising a four component phosphor system capable of being formulated to exhibit an excited luminescence falling within the visible spectrum, said phosphor system representing at least one phosphor composition having a host matrix comprising a two component mixture of zinc sulfide and cadmium sulfide activated with silver and aluminum, said system having a weight ratio of zinc sulfide to cadmium sulfide ranging from substantially 2:98 to 98:2, and activator levels of silver and aluminum within the ranges of substantially 0.005 to about 0.050 percent and substantially 0.0075 to about 0.060 weight percent respectively, each being based upon the weight of said host material.

8. A cathode-ray tube according to claim 7 wherein said four component phosphor system represents at least one phosphor composition comprising said screen, and wherein said four component phosphor composition includes an amount of silver activator within the range of substantially 0.005 to about 0.030 weight percent, and an amount of aluminum within the range of substantially 0.0075 to about 0.030 weight percent.

9. A cathode-ray tube according to claim 7 wherein said cathodoluminescent screen is formed as a patterned array of three formulations of said four component phosphor system comprising:
a substantially blue-emitting phosphor composition having a weight ratio of zinc sulfide to cadmium sulfide ranging from substantially 92:8 to about 94:6, said silver activator level ranging from substantially 0.010 to 0.030 weight percent with said aluminum activator level being within the range of substantially 0.0075 to about 0.0125 weight percent;
a substantially green-emitting phosphor composition having a weight ratio of zinc sulfide to cadmium sulfide ranging from substantially 62:38 to about 64:36, and wherein said silver activator level ranges from substantially 0.005 to about 0.030 weight percent with said aluminum activator level being within the range of substantially 0.0075 to about 0.030 weight percent; and
a substantially red-emitting phosphor composition having a weight ratio of zinc sulfide to cadmium sulfide ranging from substantially 20:80 to about 16:84, said silver activator level ranging from substantially 0.010 to about 0.030 weight percent with said aluminum activator level being within the range of substantially 0.010 to about 0.030 weight percent.

PO-1050
(5/69)

UNITED STATES PATENT OFFICE
CERTIFICATE OF CORRECTION

Patent No. 3,602,753          Dated August 31, 1971

Inventor(s) Lyle W. Evans, Sixdeniel Faria, Walter W. Slobbe, and Lyle K. Williams It is certified that error appears in the above-identified patent and that said Letters Patent are hereby corrected as shown below:

Column 6, line 20 of the specification "Table II" shows 1/8ZnCd1/4 S:Ag Al    1/8ZnCd1/4 but should read--

(ZnCd)      S:Ag,Al      (ZnCd)--.

Column 6, line 22 "1/8μa1/4" should read--(μa)--.

Column 6, line 24 "1/8$F_tL$1/4 x y 1/8$F_tL$1/4" should read--

($F_tL$)      x y     ($F_tL$)--.

Column 6, line 28 "1/89300°K1/4" should read--(9300°K)--.

Signed and sealed this 7th day of March 1972.

(SEAL)
Attest:

EDWARD M. FLETCHER, JR.          ROBERT GOTTSCHALK
Attesting Officer                 Commissioner of Patents